United States Patent [19]
Johnson

[11] Patent Number: 4,888,156
[45] Date of Patent: Dec. 19, 1989

[54] FLUID CATALYTIC CRACKING UNIT REGENERATION HAVING INTERNAL COOLING MEANS

[75] Inventor: Tiffin E. Johnson, Macungie, Pa.

[73] Assignee: Houdry Process Corporation, Allentown, Pa.

[21] Appl. No.: 188,242

[22] Filed: Apr. 29, 1988

[51] Int. Cl.⁴ .................... F27B 15/16; F27B 15/10
[52] U.S. Cl. ................................ 422/144; 422/146; 165/104.16
[58] Field of Search ............... 422/144, 145, 146, 109, 422/111; 165/104.16

[56] References Cited

U.S. PATENT DOCUMENTS

| | | | |
|---|---|---|---|
| 2,436,927 | 3/1948 | Kassel | 196/52 |
| 3,990,992 | 11/1976 | McKinney | 252/417 |
| 4,064,039 | 12/1977 | Penick | 208/160 |
| 4,219,442 | 8/1980 | Vickers | 252/417 |
| 4,353,812 | 10/1982 | Lomas et al. | 252/417 |
| 4,423,006 | 12/1983 | Vickers | 422/109 |
| 4,425,301 | 1/1984 | Vickers et al. | 422/111 |
| 4,434,245 | 2/1984 | Lomas et al. | 502/2 |
| 4,439,533 | 3/1984 | Lomas et al. | 502/6 |
| 4,594,967 | 6/1986 | Wolowodink | 122/4 D |
| 4,615,992 | 10/1986 | Murphy | 502/41 |
| 4,698,212 | 10/1987 | Walters et al. | 422/144 |
| 4,725,408 | 2/1988 | Pratt et al. | 422/144 |

Primary Examiner—Barry S. Richman
Assistant Examiner—D. John Griffith, Jr.
Attorney, Agent, or Firm—Russell L. Brewer; James C. Simmons; William F. Marsh

[57] ABSTRACT

An improved process and regenerator suited for the regeneration of coke contaminated catalysts. Such coke contaminated catalysts are formed during the fluidized bed cracking of crude oil derived feed stocks into motor fuels and other distillates. The improved regenerator is equipped with an upper combustion zone for oxidizing carbon present on the catalyst to carbon dioxide and water and a lower cooling zone wherein hot catalyst is transported from the upper combustion zone to the lower cooling zone through a substantially vertical conduit for indirect heat exchange contact with a coolant for reducing the temperature thereof. The cooled catalyst is returned to the upper combustion zone. Air is used to fluidize the cracking catalyst in the lower cooling zone and is vented to the upper combustion zone and used as a source of oxidizing gas.

5 Claims, 1 Drawing Sheet

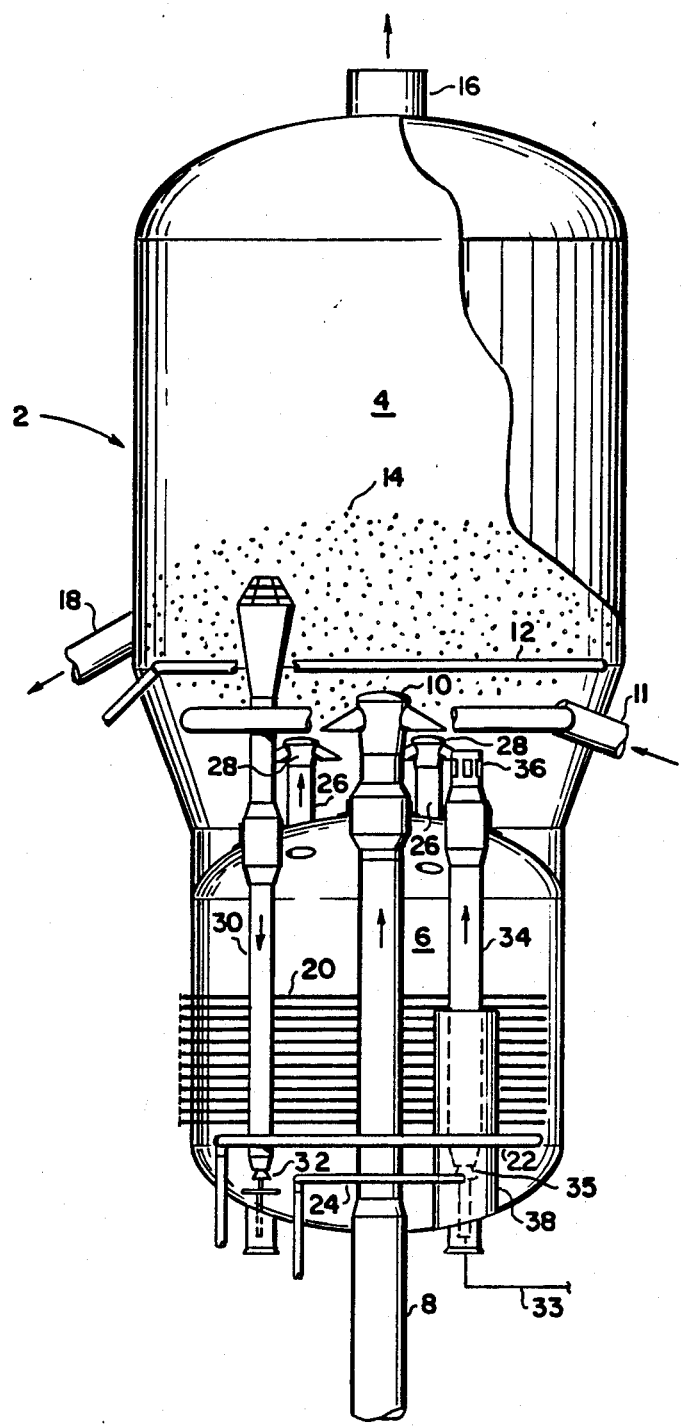

FLUID CATALYTIC CRACKING UNIT REGENERATION HAVING INTERNAL COOLING MEANS

FIELD OF THE INVENTION

This invention relates to an improved catalytic cracking unit regenerator with means for controlling temperature of the catalyst during regeneration through heat removal.

BACKGROUND OF THE INVENTION

Fluid catalytic cracking units (FCC), have been widely utilized in refining crude oil derived feedstocks into gasoline and middle distillates. Their counterparts, i.e., heavy oil cracking units (HOC) also have been widely used for cracking of heavy reduced crudes, either with prior hydrotreating or without, to produce transportation fuels. In the FCC and HOC processes, crude oil derived feeds are contacted with a silica containing catalyst at high temperature in a catalytic cracking zone which generally is a riser or fluidized dense bed reactor and the catalyst is withdrawn continuously from the cracking zone and sent to a regenerator for removal of coke deposited on the catalyst. FCC processes differ slightly from HOC processes in that the FCC process generally results in less carbon being deposited on the catalyst and therefore less heat is generated. Also, the temperature rise is less in the regenerator. Catalysts used for FCC and HOC have little resistance to deactivation when excessive temperatures are reached in the regenerator.

In recent times, it has been proposed to convert FCC units to process heavy reduced crude oil feeds. Equipment modifications have been made to accommodate the removal of increased coke content deposited upon the catalyst during the cracking phase and to accommodate the removal of the increased heat generated during the regeneration phase so that the temperature limits for the FCC units and catalysts are not exceeded. FCC and HOC regenerators requiring simultaneous regeneration of the catalyst and removal of excess heat generated generally utilize one of two systems for the removal of the excess heat. One system involves the removal of catalyst from the regenerator to an external or side cooler with return of the cooled catalyst to the regenerator, and the second utilizes cooling systems within the regenerator itself. Illustrative patents showing these concepts include the following:

U.S. Pat. No. 4,615,992 discloses a process for hydrocarbon conversion in association with a catalyst regenerator, the catalyst regenerator having a dense phase fluid catalyst combustion bed zone and a catalyst disengagement zone. The unit contains a catalyst distributor for receiving and distribution spent catalyst within the upper portion of a fluidized catalytic bed. Air is introduced into the lower portion of the vessel to oxidize the carbon or coke deposited on the catalyst and effect catalyst regeneration. An externally mounted catalyst cooler is connected to the regenerator vessel with the catalyst cooler containing an air distributor at or near the bottom for maintaining catalyst fluidization within the cooler. Air used for fluidization of the catalyst effects modest regeneration in the cooler and is returned to the upper portion of the regenerator while cooled catalyst is removed from the bottom of the catalyst cooler and reintroduced at a point near the lower portion of the dense phase of the fluidized catalyst bed zone.

U.S. Pat. No. 4,064,039 discloses a fluid catalytic cracking unit system utilizing a platinum group metal modified cracking catalyst in conjunction with a regenerator and side mounted catalyst heat exchange cooler to permit adjustment of cracking conditions independent of the heat produced in the regeneration of the catalyst.

U.S. Pat. Nos. 4,434,245; 4,353,812; and 4,439,533 disclose hydrocarbon conversion processes wherein the catalyst is first removed from a regenerator and cooled in side or external heat exchange coolers and then returned to the regenerator. As noted in these patents, the method for controlling heat removal in the regenerator involves the extent of immersion of the cooling coils in the dense phase regenerated catalyst bed or rate of flow of regenerated catalyst through the external coolers.

U.S. Pat. No. 2,436,927 discloses a fluidized catalytic conversion process wherein the crude feed is contacted with a silica-alumina type catalyst for producing high quality gasoline. Crude oil feed is contacted in a reactor and the spent catalyst withdrawn from the reactor and charged to a regenerator for removal of carbon deposited upon the catalyst. Heat removal is achieved through the use of an external cooler and control is achieved by regulating the amount of catalyst passing through that cooler.

U.S. Pat. Nos. 3,990,992 and 4,219,442 illustrate regenerator units having heat removal means different from those described above. These regenerator units are divided into two portions; the regenerator having a lower portion for effecting combustion of the catalyst and an upper section wherein residual combustion is effected along with heat removal. Heat removal is achieved through internal coils in the upper section of the reg. Temperature control is achieved by controlling the amount of regenerated catalyst removed to the upper zone and then reintroduced along with coke contaminated catalyst to the combustion zone. The balance of the regenerated catalyst is reintroduced to the catalytic reactor.

SUMMARY OF THE INVENTION

This invention relates to an improved process and apparatus for regenerating a coke contaminated catalyst at predetermined temperature for return to a hydrocarbon conversion zone. Basically, conventional apparatus or regenerators and process for regenerating coke-contaminated cracking catalysts comprised removing coke-contaminated catalyst from a hydrocarbon conversion reactor, introducing the coke-contaminated fluidized catalyst to a combustion zone within a regenerator maintained at a temperature sufficient for coke oxidation; introducing an oxidizing gas, e.g., air, into the combustion zone for effecting coke oxidation and thereby regenerating the catalyst and subsequently returning the regenerated catalyst to the hydrocarbon conversion zone. In these basic processes a hot catalyst and a hot flue gas were generated with the flue gas being removed near an upper portion of the regenerator and the hot catalyst being removed from the combustion zone to a heat exchanger wherein the catalyst temperature was reduced. A catalyst of reduced temperature was then reintroduced into the combustion zone.

The improvement in this basic regenerator or apparatus comprises the utilization of:

an upper combustion zone wherein coke-contaminated cracking catalyst is introduced, fluidized, and the coke oxidized by introducing an oxygen-containing gas through an air distributor under conditions such that a dense bed of catalyst is established near the lower portion of the upper combustion zone and hot flue gas removed from the upper portion of the upper combustion zone;

a lower cooling zone within said regenerator and below said upper combustion zone containing means for reducing the temperature of hot catalyst formed in the upper combustion zone;

air distribution means for maintaining the catalyst in a fluidized state in the lower cooling zone;

a first substantially vertically extending conduit communicating between said upper combustion zone and said lower cooling zone for removing hot catalyst from said upper combustion zone to said lower cooling zone;

optional valve means associated with said first vertically extended conduit for controlling the rate of removal of hot catalyst from said upper combustion zone to said lower cooling zone;

a second substantially vertically extending conduit communicating between said upper combustion zone and said lower cooling zone for reintroducing cooled catalyst into the upper combustion zone;

fluidization means associated with said second substantially vertically extending conduit for transporting and maintaining the cooled catalyst in a fluidized state during transport to the upper combustion zone; and optional valve means associated with said second vertically extending conduit for controlling the rate of catalyst returned to the upper combustion zone; and conduit means communicating between said upper combustion zone and said lower cooling zone for removing fluidizing gas utilized in the lower cooling zone to the upper combustion zone.

There are several advantages associated with this process and apparatus for regenerating the catalyst and these advantages include:

an ability to minimize deaeration and slumping of the catalyst during the transport of the hot catalyst from the combustion zone to the cooling zone and return of the cooled catalyst to the combustion zone;

an ability to effectively control catalyst temperature within the upper combustion zone through introduction of a cooled catalyst directly into the bed of coke contaminated catalyst being regenerated; and an ability to maximize air utilization through the usage of fluidizing gas from the cooling zone as oxidation gas in the combustion zone.

THE DRAWING

The single drawing is a sectional view of a regenerator associated with a hydrocarbon catalyst cracking unit for the practice of the invention showing an upper combustion zone for the removal of carbon deposited on the catalyst and a lower cooling or heat removal zone for removal of heat from the catalyst.

DETAILED DESCRIPTION OF THE INVENTION

The present invention relates to a process and to an apparatus for the regeneration of a coke-contaminated catalyst generated in a catalytic cracking unit. The coke contaminated catalyst is contacted with an oxidizing gas wherein the carbon is converted to carbon dioxide and exhausted from the regenerator and the thus regenerated catalyst recycled to the hydrocarbon conversion reactor. The amount of heat generated in the regenerator is a function of the amount of coke present on the catalyst and temperature control must be maintained with respect to the catalyst tolerances in order to prevent deactivation due to sintering and loss of crystalline structure.

Reference is now made to the drawing to facilitate an understanding of the process and apparatus of this invention. In the drawing, a regenerator 2 commonly used in the regeneration of coke contaminated catalyst in both fluid catalytic cracking and heavy oil cracking processes, is divided into two zones which comprise an upper combustion zone 4 and a lower cooling zone 6. Spent catalyst from a reactor effecting hydrocarbon conversion (not shown) is introduced through carrier line 8 which terminates in spent catalyst distributor 10 in upper combustion zone 4. This coke contaminated catalyst typically contains from about 0.1 to 5 weight percent carbon and lesser percentages of hydrogen, sulfur and other elements. The flow of catalyst into upper combustion zone 4 through carrier line 8 is controlled by means of a valve (not shown) associated with the hydrocarbon conversion reactor. As the spent catalyst is discharged from catalyst distributor 10, it is fluidized in upper combustion zone 4 by an air distribution system which comprises air distribution rings 11 and 12. Air is forced through apertures in air distribution rings 11 and 12 at sufficient velocity to effect fluidization. Other means for effecting fluidization of the spent catalyst commonly used in the art can be used for this purpose. The primary function of air distribution ring 12 is to provide sufficient air for maintaining fluidization of the coke contaminated catalyst and effecting combustion of the coke contained on the catalyst. As the spent catalyst is fluidized, it forms into a dense bed 14 with hot flue gas exiting the upper portion of the upper combustion zone 4 which is ultimately discharged through flue gas outlet 16. Regenerated catalyst is returned to the hydrocarbon conversion reactor through line 18.

The amount of heat generated in the upper combustion zone 4 is a function of the amount of carbon introduced with the spent catalyst. As previously indicated in the processing of heavy reduced crude oil feeds such catalysts contain substantially more coke than catalysts normally associated with the processing of lighter gas oils in the production of gasoline and middle distillate fuels. Regenerators for fluid catalytic cracking units commonly have not been designed to handle the high coke content of spent catalysts from reactors processing heavy reduced crude oil feeds. The regenerator of this invention permits such processing with great efficiency. This is achieved through the establishment of lower cooling zone 6 which is separate and distinct from upper combustion zone 4 within regenerator 2. The function of lower cooling zone 6 is the removal of heat from the spent catalyst absorbed in the combustion zone and return of the cooled catalyst to the upper combustion zone thus maintaining optimum temperature with respect to catalyst regeneration and activity maintenance in that zone. Lower cooling zone 6 houses a plurality of tubular cooling coils 20 which line the interior surface of lower cooling zone 6. Other means for removing heat from lower cooling zone 6 in place of cooling coils 20 can be utilized such as heat exchange plates, etc. Cooling coils lend themselves to the introduction of water, steam or other coolant for removal of heat from the zone. Lower cooling zone 6 is equipped with an air distribution system comprising an outer fluidization ring 22 and an inner fluidization ring 24 wherein fluidizing gas, e.g., air is introduced and used for effecting fluidization of the hot catalyst. The air distribution effecting fluidization of the hot catalyst causes it to come into contact with cooling coils 20 for heat exchange and removal of the heat from such catalyst and also to effect partial combustion of residual coke present on the catalyst. Air used for fluidization ion lower cooling zone 6 then is removed through outlet 26 which terminates in vent air distributor 28 in upper combustion zone 4 and thus contributes to regeneration of coked catalyst.

Hot catalyst is removed from upper combustion zone 4 in regenerator 2 by means of catalyst cooler stand pipe 30. Catalyst cooler stand pipe 30 is a substantially vertically extending conduit communicating between upper combustion zone 4 and lower cooling zone 6 and the hot catalyst is withdrawn through the the interior of catalyst cooler stand pipe 30 downwardly into lower cooling zone 6. Valve 32 is associated with lower catalyst cooler stand pipe 30 to control the rate of catalyst withdrawal from upper combustion zone 4 and the rate of withdrawal is dependent upon the heat load and temperature in upper combustion zone 4. As the coke level in the catalyst increases and heat removal requirements in lower cooling zone 6 increase, catalyst is withdrawn from the upper combustion zone at a greater rate, such rate being controlled through valve 32. In a preferred embodiment, the catalyst cooler stand pipe 30 terminates in upper combustion zone 4 near the upper portion of dense bed 14. This is the preferred withdrawal point since the catalyst is at its lowest carbon content. This permits greater efficiency of heat removal in lower cooling zone 6 and also decreases the heat load generated through combustion in the lower cooling zone 6. By control of heat generation and heat removal within upper combustion zone 4 and lower cooling zone 6, optimum temperatures can be maintained and the purposes achieved by these separate zones can be enhanced.

The spent catalyst obtained from upper combustion zone 4 and cooled in lower cooling zone 6 is returned to upper combustion zone 4 via catalyst cooler carrier conduit 34 which terminates in catalyst cooler distributor 36. The termination point in upper combustion zone 6 and dense fluidized bed 14 preferably is at an elevation proximate that of vent air distributor 28 and below the introduction of spent catalyst from the hydrocarbon conversion reactor through spent catalyst distributor 10. However, other elevations within upper combustion zone 4 can be utilized. Catalyst cooler well 38 is associated with catalyst cooler carrier line 34 and is located at the lower portion thereof. Fluidized catalyst, at reduced temperature flows downwardly into catalyst cooler well 38 and then is forced upwardly through catalyst cooler carrier line 34 by means of an air lift system 33 at the bottom of catalyst cooler carrier line 34. The air lift then effects distribution of the catalyst and ultimate return of regeneration catalyst to the regenerator through line 18. The lift air is subsequently used for regeneration in upper combustion zone 4. Plug valve 35 is used to control the flow of catalyst from lower cooling zone 6 to upper combustion zone 4.

The arrangement of the regenerator and process wherein an upper combustion zone 4 and lower cooling zone 6 is established with spent catalyst being withdrawn from the combustion zone, cooled and returned to the combustion zone by means of a transport mechanism comprising a substantially vertically extending catalyst cooler stand pipe 30 and catalyst cooler carrier line 34 enhances transfer of the catalyst from one zone to the other because it minimizes deaeration of the fluidized catalyst. The substantially vertical drop from upper combustion zone 4 into lower cooling zone 6 plus the substantially vertical rise of cooled regenerated catalyst from lower cooling zone 6 into upper combustion zone 4 minimizes settling which often occurs where these transfer lines are disposed at an angle between these zones as is apparent from zones wherein the catalyst cooling system is achieved through an adjacent external coolers. The angular communication systems associated with external coolers allows fluidizing air flow to separate from the catalyst and often the catalyst settles and slumps rather than flow in suspended state from the combustion zone to the cooling zone and return to the combustion zone. Settling often results in plugging of the system and makes the system inoperable at its worst and because it alters catalyst flow rate, adversely affects temperature control in the zones at best. Further, the arrangement whereby the cooling zone is below the upper combustion zone within the regenerator permits the return of fluidizing gas from the cooling zone to the upper combustion zone, as for example, via vent air distributor 28 thereby enhancing the efficiency of air utilization within the regenerator and minimizing overall air requirements. This also reduces the amount of flue gas withdrawn through line 16 which is subject to downstream treatment. It also permits greater control over catalyst temperature. Cooled regenerated catalyst is reintroduced into the heat of the combustion zone and the cooling and dilution effect of such catalyst moderates combustion temperature.

What is claimed is:

1. A fluidized bed catalyst regenerator suited for the oxidation of coke deposited on a spent catalyst from a catalytic cracking unit and thereby producing a regenerated catalyst, said regenerator comprising:
   an inlet for spent catalyst;
   an upper combustion zone wherein coke contaminated catalyst is introduced for purposes of oxidizing coke deposited on said catalyst;
   air distribution means for fluidizing and oxidizing coke on said catalyst in said upper combustion zone;
   a flue gas outlet for removing flue gas from said upper combustion zone;
   a lower cooling zone established within said regenerator and below said upper combustion zone containing means for reducing the temperature of hot catalyst formed in the upper combustion zone;
   gas distribution means for maintaining the catalyst in a fluidized state in said lower cooling zone;
   a first substantially vertically extending conduit communicating between said upper combustion zone and said lower cooling zone for transporting hot catalyst from said upper combustion zone to said lower cooling zone;
   a second substantially vertically extending conduit communicating between said upper combustion zone and said lower cooling zone for transporting cooled catalyst to the upper combustion zone;
   fluidization means associated with said second substantially vertically extending conduit for maintaining and transporting the cooled catalyst in fluidized state to said upper combustion zone;

means separate from said second conduit communicating between said upper combustion zone and said lower cooling zone for transporting fluidizing gas utilized in the lower cooling zone to the upper combustion zone; and a regenerated catalyst conduit.

2. The regenerator of claim 1 wherein valve means are associated with said first vertically extending conduit for controlling the rate of removal of hot catalyst from said upper combustion zone to said lower cooling zone.

3. The regenerator of claim 2 wherein the upper end of the said first vertically extending conduit is placed at an elevation not below said regenerated catalyst conduit.

4. The regenerator of claim 3 wherein said means communicating between said upper combustion zone and said lower cooling zone for removing fluidizing gas from said lower cooling zone to said upper combustion zone terminates at an elevation point below the air distribution means in said upper combustion zone.

5. The regenerator of claim 4 wherein said second substantially vertical conduit is equipped with a well for receiving cooled catalyst and for discharge into said second substantially vertical conduit and valve means for controlling the rate of transport of cooled catalyst to said upper combustion zone.

* * * * *